May 26, 1964 S. E. O. BAGER 3,134,973
RADAR APPARATUS
Filed July 19, 1957 2 Sheets-Sheet 1
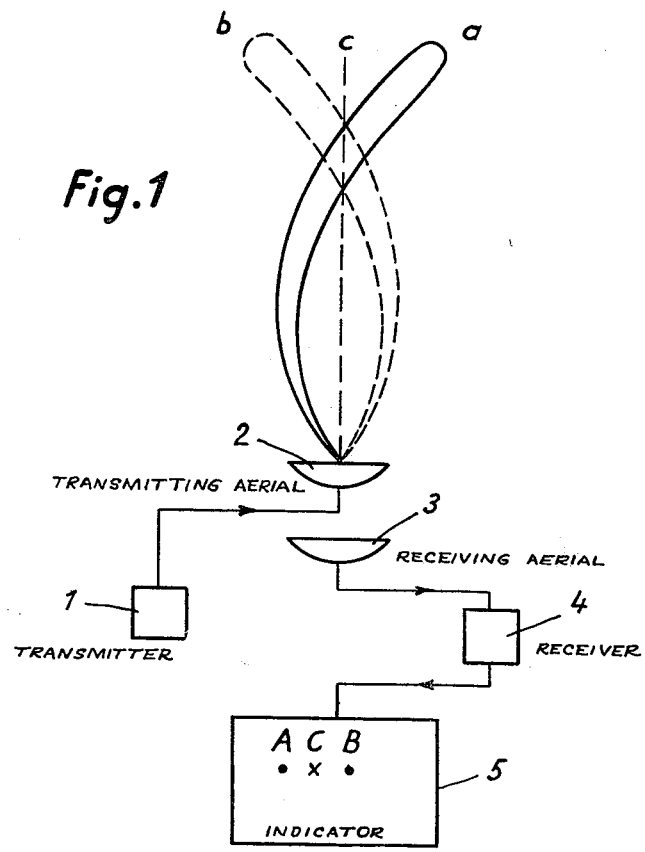
INVENTOR
SVEN ERNST OLOF BAGER
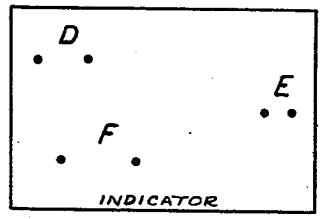
ATTORNEYS

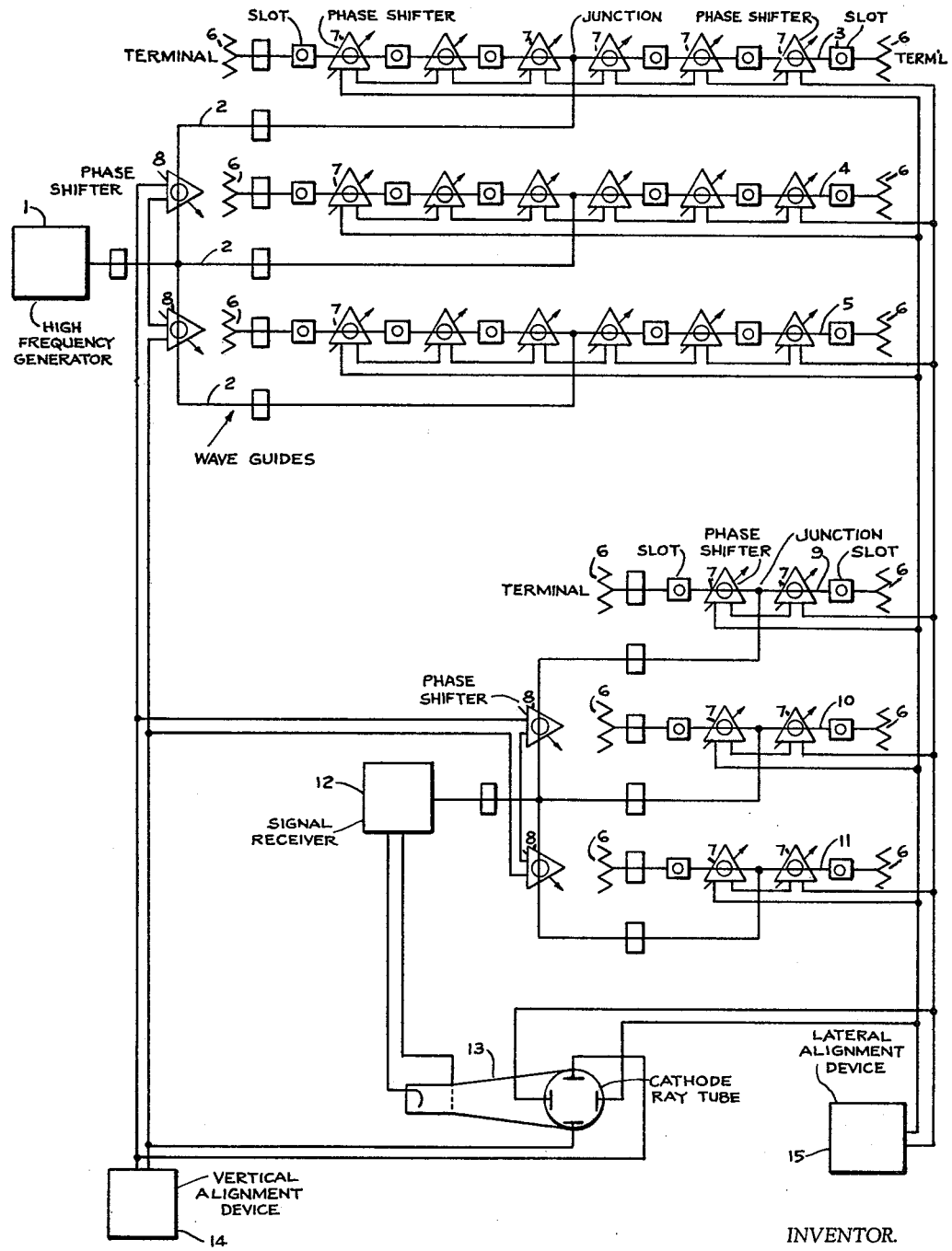

United States Patent Office
3,134,973
Patented May 26, 1964

3,134,973
RADAR APPARATUS
Sven Ernst Olof Bager, Stockholm, Sweden, assignor to Telefonaktiebolaget L M Ericsson, Stockholm, Sweden, a corporation of Sweden
Filed July 19, 1957, Ser. No. 673,057
Claims priority, application Sweden July 30, 1956
1 Claim. (Cl. 343—10)

The invention relates to radar apparatus, and more particularly to radar apparatus which indicates the location of an object in space by all three pertinent dimensions. In many cases it is desirable for orientation, survey, etc. that the position of an object—for instance, an airplane—be shown in all dimensions.

According to the invention, the apparatus comprises a transmitting part, a receiving part, an indicating part and an aerial array. The transmitted signal is continuous and has a constant frequency. It is transmitted from the aerial as a radiation within a narrow lobe, the direction of which is changed continually. The signal is picked up by another aerial with such an alignment and such a receiving field that it can pick up echoes from an unlimited or a more or less limited space section. The received signals are marked on an indicator in positions controlled by the direction of the output radiation lobe at the receiving time. As the direction of the output beam is changed gradually and the received signals are marked at a location determined by the moment of reception, and as the difference between the transmitting time and the receiving time is dependent upon the distance of the object from a reference location, the echo emanating from a given object will be marked as originating from a direction deviating from the true direction, the extent of the deviation being dependent upon the distance of the object. If, for instance, either by using different apparatus or by moving the transmitting lobe at different speeds, different displacements of the echo markings are obtained at the indicator, the difference between these markings being indicative of the actual distance. Thus, it is advisable to have the transmitting lobe alternately moving into two opposite directions and with the same speed in both directions. If the markings on the indicator appear without additional displacement, one and the same object will yield two markings which are displaced in opposite directions from the position corresponding to the direction of the transmitting lobe in reference to the object, these displacements being then proportional to the actual distance. If the aerial scans a certain space sector and the indicator is arranged in such a way that the markings will be dependent upon the transmitting direction of the aerial when an echo is received, an echo view consisting of two by two markings is obtained. The middle point of the outline defined by these markings then indicates the true direction to the object and the distance between the markings and the distance of the object.

The two differently displaced markings need not appear on the same indicator, but may appear on separate indicators, for instance, in such a way that the different markings are separated by different color and then combined, or so that an image of a certain stereo character is obtained. Alternatively, the markings may also be given such a displacement that the distance between them is large at a small distance of the object and is reduced at a great distance of the object. In the described arrangement, two markings displaced in relation to each other have been indicated. The number of markings may, however, be increased by moving the aerial in several different directions.

The receiving aerial, which need not be placed near the transmitting aerial, can have either a fixed lobe or one which is displaced together with that of the transmitting aerial. The lobe of the receiving aerial can be formed so that echoes are received from certain distances, and so that the receiving capacity of the aerial will be different for echoes from different distances, for instance, so that echoes from an object close by will be less in strength in comparison with echoes from objects far away.

The above-described apparatus is designed to give a three-dimensional indication, but the determination of the distance according to the principle of the invention can also be used in other cases. A continuous unmodulated wave is used in the apparatus, but a change in the direction of the emitted radiation may be obtained by changing the signal frequency and thereby the direction of the lobe in an aerial intended therefor. Other modifications of the emitted wave may, of course, also be provided, as they do not prevent the use of the above-described principle. Of course, it is also possible to scan several space sections by using several transmitting lobes and different receiving parts at the same time.

An application of the apparatus is, as mentioned before, radar scanning from an airplane of certain space sections, for instance, in order to determine which object should be more carefully investigated. The apparatus can, however, be used for other types of scanning, such as scanning in water, or for geological investigations, or investigations of material.

The invention will now be described more in detail in connection with the attached drawings, wherein:

FIG. 1 shows diagrammatically the principle of the invention;

FIG. 2 shows a marking example on the indicator; and

FIG. 3 shows an arrangement according to the invention more in detail.

In FIG. 1, the numeral 1 indicates a transmitter transmitting a signal to the transmitting aerial 2, which transmits radiation in a narrow movable lobe. This lobe scans cyclically a great number of planes, the searching in each plane taking place in two opposite directions. If the beam has a sufficient extension perpendicular to the plane, the planes for the different directions may deviate somewhat from each other. In the figure the lobe $a$ represents movement in counterclockwise direction, and the lobe $b$ movement in clockwise direction. The form of the lobes indicates approximately the energy dispersion in space at two different moments. Lobe $a$ signifies one direction, and lobe $b$ the other direction, as explained before. The transmitted radiation is supposed to strike an object, and it has been transmitted by a lobe which had the direction $c$ when the radiation left the aerial. The echoes of the object are picked up by the receiving aerial 3, the lobe of which is supposed to cover the actual directions, and are transmitted via the receiver 4 to the indicator 5. This indicator is also connected with the transmitting aerial 2 in such a way (now shown) that a received signal is marked at a place controlled by the direction of the transmitting lobe at the transmitting aerial. This produces for the different directions of movement the markings A and B, which correspond to the lobes $a$ and $b$. The real direction corresponds to a point C, between A and B, and the distance between A and B corresponds to the actual distance of the object.

The movement of the aerial (the movement of the lobe) can be made mechanically, or, since a high rate of speed is required, can suitably be made electronically.

The following is a practical example of the rates of speed required for radar: Suppose that the distance of the object is 15 km. The time to and from the object will then be $$\frac{2 \cdot 15 \text{ km.}}{300{,}000 \text{ km./s}} = 100 \text{ }\mu\text{s}$$

Suppose that the suitable movement of the aerial during this time is 0.05 rad. This gives a rotational speed of $$\frac{0.05 \text{ rad.}}{100 \text{ }\mu\text{s}} = \frac{1 \text{ rad.}}{2 \text{ millisec.}} = 80 \text{ rev./s.}$$

A marking example is shown in FIG. 2, where the indicator marks echoes from objects at different distances. D indicates an object at a medium distance, E one at a short distance, and F one at a great distance.

FIG. 3 shows an embodiment of the radar system according to the invention. Numeral 1 designates a generator for the high frequency radio wave to be transmitted. This generator feeds through a wave guide which has three different branches 2, a transmitting aerial which has three parts 3, 4 and 5 situated in the same vertical plane. Each part consists of a wave guide fed at the midpoint, and each wave guide has uniformly spaced slots and terminals 6. The part of the wave guide between each two slots is a variable phase shifter, the phase shift being obtained by a ferrite adapter. This is placed in the field of a coil 7. The phase shift is obtained by changing the current through the coil and thus the field of the coil. As a result, the mutual phase displacement for the different slots is changed, and hence also the side direction for the transmitting radiation. The side direction for the transmitted radiation can thus be controlled by means of the current through the coils around the wave guides provided with slots.

The aerial parts 3 and 5 are fed through wave guides in the form of phase shifters provided with adapters and surrounding coils 8. The phase shift and thereby the relative phase displacement for the aerial parts and the elevation of the transmitted radiation are controlled by the current through the coils.

The transmitted radiation is received by aerial parts 9, 10 and 11, which are designed in the same way as transmitter aerials 3–5, and the aerial alignment, laterally and vertically, is controlled in the same way as for the transmitting aerial. The radiation lobe of the receiving aerial occupies a larger side angle than that of the transmitting aerial. Such larger side angle is obtained by a small number of slots in each aerial part. The signal received from the receiving aerial is fed to a receiver 12, where it is demodulated, and it is then fed to a cathode ray tube 13, where it controls the intensity of the electron beam.

A device 14 produces direction signals effecting vertical alignment for voltages varying relatively slowly in time. These signals produce current in the coils for vertical alignment in the transmitting and receiving aerials, which thus will have the same alignment. The voltage is also fed to the vertical deflection plates of a conventional cathode ray tube, a light spot on the screen then giving a level corresponding to the aerial elevation.

Another device 15 produces direction signals effecting lateral alignment for voltages varying in time. These voltages are changed continuously and alternately in two opposite directions, and in a manner corresponding to that mentioned above, they guide the lateral alignment of the aerials and the side position of the light spot. The changes in the voltage and therewith the changes in the direction and position, vertical and lateral, occur so rapidly that they will have a suitable and desirable size during the time interval during which a certain radiation emanates from the transmitting aerial and until a reflected part of this radiation has been picked up by the receiving aerial.

The aerial and the beam radiated by it search a given area which is determined by the turning angle of the aerial. An object appearing or located in one of the limit directions, that is, the angular direction at which the aerial changes its direction of turning, cannot cause properly defined markings on the screen, and hence the screen is so designed that it will not cover the entire sector searched by the searching angle of the aerial, or provisions may be made which will extinguish marking spots representing objects located in the border of the sector limits. In other words, objects appearing at or in the immediate vicinity of the limits of the search sector are prevented from producing a visible image on the screen.

The system functions so that a certain sector of the spaced is scanned by a rapid lateral movement. This lateral scanning is made at different levels, which can be changed independently of the side position. However, it is more suitable to change the level, when the side position, after being changed from one direction of movement and into the opposite direction of movement, has returned to a limit side position. When all the levels are scanned, the level changes are made in the opposite direction, or the level can also be changed stepwise in reference to an initial position. The coordination between the level and the side direction is not indicated, and also the manner in which the voltage representing the level, and with it the direction of the level, are changed is not explained, since it is believed that this is not essential for an understanding of the invention.

During scanning the radiation is reflected from a reflecting object in the form of echoes. The greater the distance is of a certain object, the greater will be the time difference between signal and echo, and the more the direction and the level marking will be changed. When the transmitting beam and the corresponding marking are moved to the right, the position will be marked to the right of the position corresponding to the right side direction, and vice versa, the distance between these markings then corresponding to the actual distance to the object in question. Vertically the marking corresponds to the right level direction, eventually with a non-neglected displacement (see, for instance, FIG. 2).

The invention is of course not limited to the detailed example shown in the drawing, but can be varied as to details within the scope of the principle of the invention.

I claim:

An apparatus for indicating the distance and the direction of the location of an object in relation to a reference location, said apparatus comprising high frequency generating means generating continuous waves, a transmitting antenna fed by said generating means and radiating signals in the form of at least one search lobe, a signal-receiving antenna, and an indicating means having an indicating screen for marking the positions of signals radiated by the transmitting antenna, reflected from the object and received by the receiving antenna, said transmitting and receiving antennas being located at said reference location, said lobe of the transmitting antenna being rotatable alternately in two opposite directions of movement at so high a continuous angular speed that during the time for the radiation to and from the object in the direction of said search lobe an angle alteration observable on the screen is obtained, said receiving antenna having a lobe covering the angles in which signals transmitted from the transmitting antenna and reflected from the object are returned, said indicating means being connected in circuit with said receiving antenna and so arranged that the markings, one for each one of said directions of movements, showing the positions of signals from the object received by the receiving antenna, indicate positions corresponding to the direction of the transmiting lobe at the moment when the signal is received at the receiving antenna, the true direction of the object in relation to the location being represented by the horizontal and vertical position, respectively, of the midpoint between said two markings on the screen, and the distance of the object being represented by the spacing between said markings on the screen.

References Cited in the file of this patent

UNITED STATES PATENTS

| | | |
|---|---|---|
| 2,515,339 | Doherty | July 18, 1950 |
| 2,530,060 | Holdam | Nov. 14, 1950 |
| 2,756,417 | Bartelink | July 24, 1956 |